(12) United States Patent
Upton et al.

(10) Patent No.: US 9,083,951 B2
(45) Date of Patent: Jul. 14, 2015

(54) ADAPTABLE VIDEO ARCHITECTURES

(75) Inventors: Eben Upton, Reach (GB); Graham Veitch, Cambridge (GB); Alan Morgan, Milton (GB); James Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 719 days.

(21) Appl. No.: 13/250,518

(22) Filed: Sep. 30, 2011

(65) Prior Publication Data

US 2013/0022101 A1 Jan. 24, 2013

Related U.S. Application Data

(60) Provisional application No. 61/509,797, filed on Jul. 20, 2011.

(51) Int. Cl.
| | |
|---|---|
| H04N 7/12 | (2006.01) |
| H04N 19/42 | (2014.01) |
| H04N 19/127 | (2014.01) |
| H04N 19/156 | (2014.01) |
| H04N 19/187 | (2014.01) |
| G06F 15/16 | (2006.01) |
| G06F 13/364 | (2006.01) |

(52) U.S. Cl.
CPC ....... *H04N 19/00527* (2013.01); *H04N 19/127* (2014.11); *H04N 19/156* (2014.11); *H04N 19/187* (2014.11); *H04N 19/439* (2014.11); *G06F 13/364* (2013.01); *G06F 15/16* (2013.01)

(58) Field of Classification Search
USPC .................................................. 375/240.02
See application file for complete search history.

(56) References Cited

U.S. PATENT DOCUMENTS

| | | | |
|---|---|---|---|
| 6,480,541 B1 | 11/2002 | Girod et al. | |
| 7,036,001 B2 | 4/2006 | Barlow et al. | |
| 7,069,417 B2 | 6/2006 | Barlow et al. | |
| 7,457,941 B2 | 11/2008 | Barlow et al. | |
| 7,818,540 B2 | 10/2010 | Barlow et al. | |
| 2004/0260755 A1* | 12/2004 | Bardzil et al. | 709/200 |
| 2006/0126728 A1* | 6/2006 | Yu et al. | 375/240.03 |

(Continued)

OTHER PUBLICATIONS

Amer, et al.,"Reconfigurable video coding on multicore," IEEE Signal processing Magazine, Nov. 2009, vol. 26, No. 6, pp. 113-123.

(Continued)

*Primary Examiner* — Tracy Li
(74) *Attorney, Agent, or Firm* — McDermott Will & Emery LLP

(57) ABSTRACT

Various methods and systems are provided for adaptable video architectures. In one embodiment, a method for adapting video processing of a video device includes processing a video stream along a first pipeline pathway defined by a plurality of interconnected pipeline elements. In response to detecting a change in a system condition of the video device, the pipeline pathway is transitioned to a second pipeline pathway by reconfiguring at least one of the pipeline element interconnections. In another embodiment, a method includes obtaining a video stream. A first subset bitstream having a first resolution is processed in a video pipeline of a video device and video information is extracted from the video pipeline during the processing. At least a portion of the extracted video information is then to a video pipeline of the video device for processing a second subset bitstream having a second resolution higher than the first resolution.

22 Claims, 4 Drawing Sheets

(56) References Cited

U.S. PATENT DOCUMENTS

| | | |
|---|---|---|
| 2007/0047565 A1 | 3/2007 | Van Moffaert et al. |
| 2007/0094444 A1* | 4/2007 | Sutardja ................. 711/112 |
| 2007/0288831 A1* | 12/2007 | Houki ..................... 714/776 |
| 2008/0170621 A1* | 7/2008 | Dvir et al. ............. 375/240.18 |
| 2009/0097548 A1* | 4/2009 | Karczewicz et al. .... 375/240.03 |
| 2009/0100252 A1 | 4/2009 | Barlow et al. |
| 2009/0213870 A1 | 8/2009 | Terasawa et al. |
| 2010/0254382 A1 | 10/2010 | Steffen et al. |
| 2010/0268841 A1 | 10/2010 | Xhafa et al. |
| 2011/0188575 A1* | 8/2011 | Pun et al. ............. 375/240.13 |
| 2012/0093218 A1 | 4/2012 | Chang et al. |
| 2012/0179833 A1* | 7/2012 | Kenrick et al. .......... 709/231 |
| 2013/0083843 A1 | 4/2013 | Bennett |

OTHER PUBLICATIONS

Philp, et al., "Decoder Description Syntax for fully configurable video coding," IEEE International Conference on Image Processing, Nov. 2009, pp. 769-772.

Bystrom, et al., "Dynamic replacement of video coding elements," Signal Processing: Image Communication, Apr. 2010, vol. 25, No. 4, pp. 303-313.

Richardson, et al., "Implementing Fully Configurable Video Coding," IEEE International Conference on Image Processing, Nov. 2009, pp. 765-768.

Anonymous, "The H.264 Advanced Video Compression Standard, Second Edition" Apr. 2010, John Wiley & Sons, Chapter 10, pp. 287-311.

\* cited by examiner

ADAPTABLE VIDEO ARCHITECTURES

CROSS REFERENCE TO RELATED APPLICATIONS

This application claims priority to U.S. provisional application entitled "MULTIMEDIA PROCESSING" having Ser. No. 61/509,797, filed Jul. 20, 2011, the entirety of which is hereby incorporated by reference.

BACKGROUND

Processing requirements are advancing as the world turns toward multimedia. The availability of internet multimedia content continues to improve with some sites supporting full high definition video sharing. The added use of video conferencing has also increased the demand for better quality and faster processing. In addition, cell phones are increasingly used as digital cameras and camcorders. The move to mobile equipment is increasing the demand for high resolution image processing with low power consumption.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
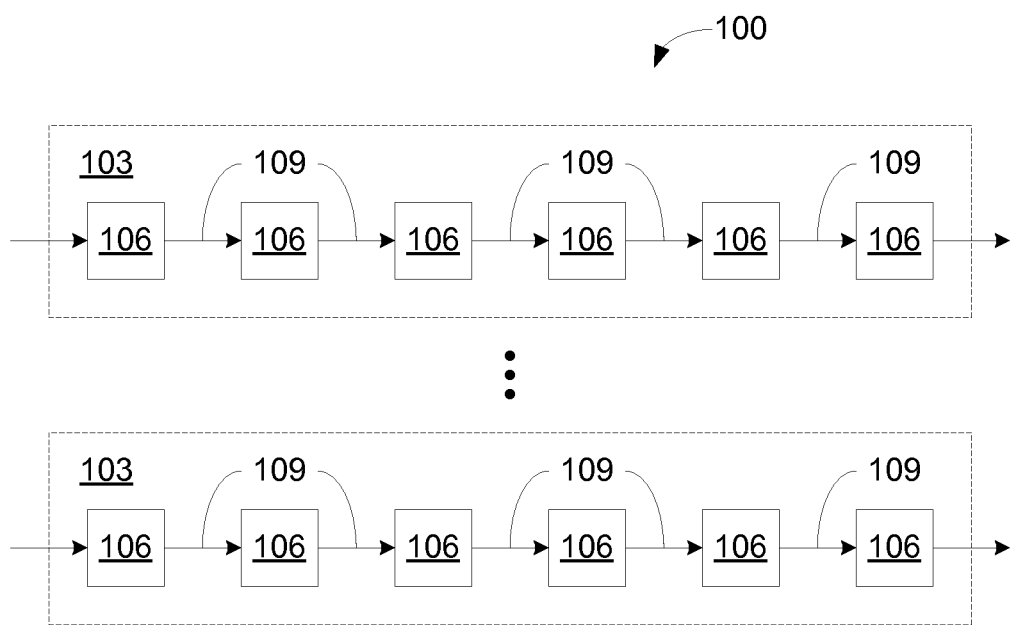
FIG. 1 is a graphical representation of an example of a video device in accordance with various embodiments of the present disclosure.

Image and multimedia processing may be provided through processing circuits implemented in individual chips or chip sets. For example, the multimedia processing may be implemented with a single chip having flexible and low power architecture. The processor architecture may be configured in hardware and/or software executed by processing hardware (e.g., a processing unit). Most conventional video coding architectures and designs are dedicated (hardware and/or software) to only one video coding standard and for servicing one video stream based thereon at a time.

The adaptable video architecture is implemented in both hardware and software executed by hardware. An adaptable video (transcode-encode-decode) architecture is configured to fully and simultaneously support any number of video stream types, where each type is defined by one of a plurality of video coding standards. The hardware is time-shared between the multiple streams to provide nearly simultaneous processing of the streams. The net effect of the fine-grained time-sharing is that it appears to a user that the multiple streams are handled simultaneously by the video architecture.

Most conventional video coding architectures are dedicated to a single video coding standard and for servicing one video stream at a time based upon that video coding standard. Software based architectures may be utilized for multiple standards but service only one stream at a time. In addition, the software based architectures face substantial limitations (especially for cutting edge standards) by not having access to dedicated hardware and for usurping general purpose processing resources. On the other hand, dedicated hardware places different power, space and cost demands on a design. To support multiple video coding standards in the architecture, compromises are made to implement each of the video coding standards: (a) in software (without hardware acceleration); (b) in dedicated hardware; or (c) at an inferior performance level (e.g., at a reduced frame rate, resolution, quality, etc.) via a combination of (a) and (b); or not implement (or support) a video coding standard at all. Further, once such compromises have been made, they become fixed design constraints that may or may not provide adequate service or underutilize the resources in a device under particular streaming circumstances. For example, MPEG2 may not have been implemented with hardware acceleration. However, a user's device may be used 99% of the time viewing MPEG2 streams, all the while dedicated H.264 hardware sits idle.

The adaptable transcode-encode-decode architecture uses two levels of architectural adaptability to overcome limitations. First, real time adaptation may be used to best support one or more simultaneous video streams. The streams may be of the same or differing video stream types. Second, a flexible architectural offering allows for design decision tailoring to fit a specific platform. For each coding standard (or type), several tiers of support (or stream pathways) may be offered to support multiple simultaneous video streams having the same or differing types. Such tiers involve transcode-encode-decode functional elements that may be carried out in software and/or with hardware acceleration. Serial, cyclic serial, parallel and combinations thereof may all be offered. This overall architectural offering with all underlying tiers may be fully integrated into a device or may be tailored to fit current design constraints by eliminating specific "element" tiers without requiring an underlying redesign.

Referring to FIG. 1, shown is a graphical representation of a video device 100 including, e.g., a transcoder, encoder, or decoder that includes one or more hardware pipelines 103 or tiers for processing one or more streams of video data. Each pipeline 103 includes a plurality of elements 106 for processing the video stream data. The pipelines 103 are configured to allow the interconnections 109 between the pipeline elements 106 to be diverted based upon system conditions of the video device and/or video stream. The pipeline pathway may be reconfigured by diverting at least one of the interconnections allow processing by other pipeline elements 106 and/or by software modules 112 executed by shared general-purpose processing resources of the video device.

Figure 2:
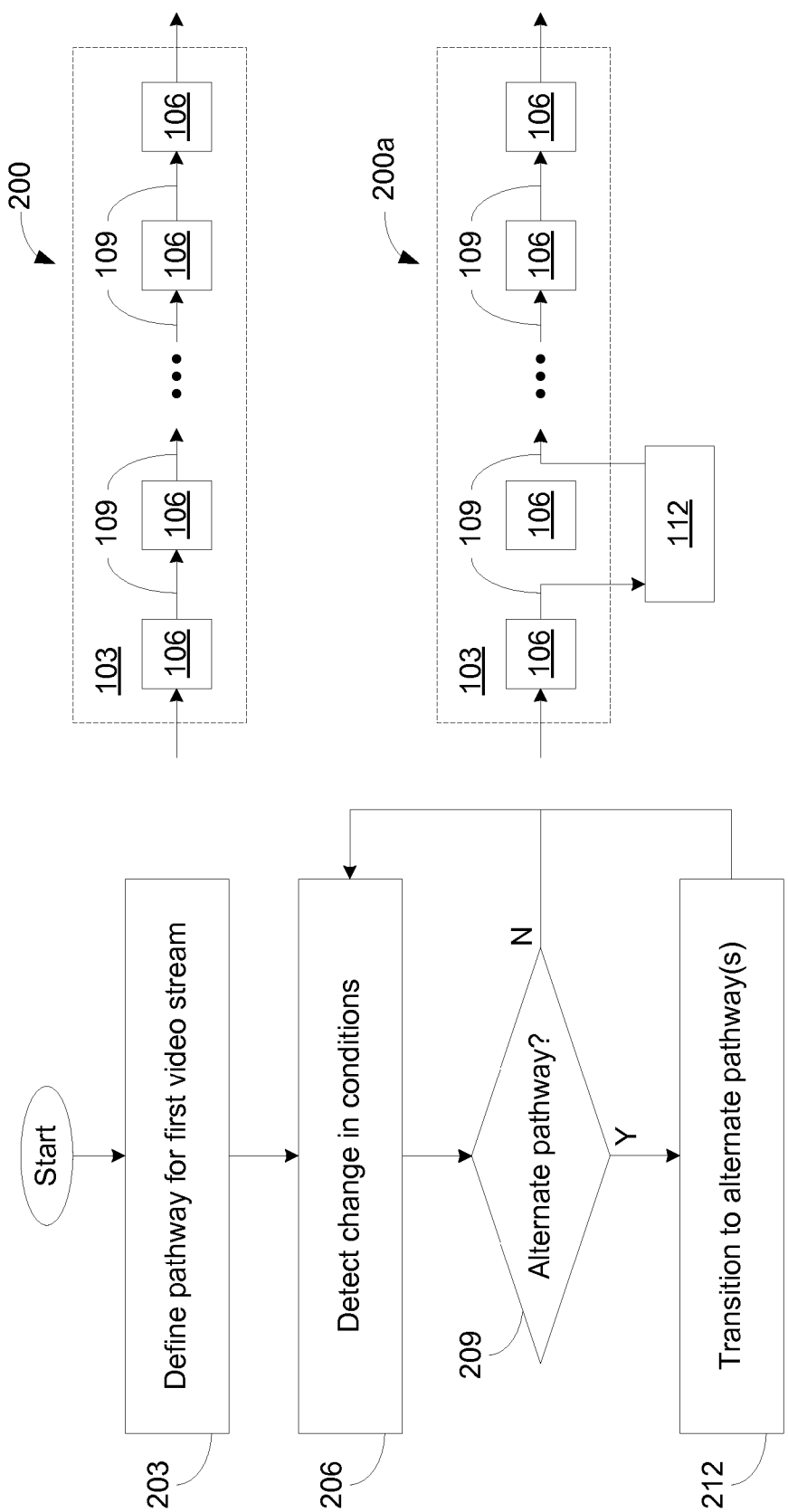
FIG. 2 is a flow chart illustrating an example of the real time adaptation of video processing in accordance with various embodiments of the present disclosure.

All element tiers that make it into a device may function in a real time adaptive way to support shared processing resources for load balancing, multiple video stream conditions that arise during device use, and battery constraints. A pathway adaptation module executed by shared general-purpose processing resources of the video device monitors the conditions of the video device and controls rerouting the pipeline interconnections. Referring to FIG. 2, shown is a flow chart illustrating an example of the real time adaptation of a pipeline pathway 200. Beginning with box 203, a pipeline pathway 200 is defined for a first video stream. For example, in a decoder, a decode pathway 200 may be defined wherein each pipeline element 106 is selected for the highest performance but with substantial power utilization to service a single video stream. The decode pathway 200 may be implemented in hardware or a combination of hardware and software executed by shared general-purpose processing resources such as, e.g., a processor, application specific chip, and/or other appropriate hardware. In box 206, a change in one or more of the system conditions is detected. For example, during the visual presentation of a first video stream, battery conditions may change.

An alternate pathway may be selected in box 209 based at least in part upon the condition changes. For example, an alternative decoder pathway 200a may be selected which offers better battery performance while delivering acceptable video quality. The alternate pipeline pathway 200a may include, e.g., diverting the interconnections 109 between the pipeline elements 106 for processing by other pipeline elements 106 or by executed software modules 112, bypassing pipeline elements 106 (which may be deactivated to reduce power usage), and/or rerouting to another pipeline pathway. Alternate pipeline pathways 200a may be selected from a plurality of predefined pipeline pathways based upon a defined set of conditions or may be determined using an expert system (or other appropriate pattern recognition system) based upon the system conditions. If an alternate pathway 200a is selected, then the video stream transitions to the alternate pathway in box 212 (e.g., transition between the two pathways 200 and 200a by synchronizing to a reference frame) and returns to box 206 to detect the next condition change. If an alternate pathway is not selected, then the video stream remains on the current pathway and returns to box 206 to detect the next condition change.

Another change in conditions may then be detected such as, e.g., a user selecting a second video stream of the same or different type to be displayed in a shared screen arrangement. Again, it is determined in box 209 if an alternate pathway should be used. For example, the decode architecture may adapt to best support the two streams by selecting various element tiers to form two pipeline pathways, one for processing each of the two streams. In box 212, the video streams are transitioned and the sequence returns to box 206 to detect the next condition change. The sequence continues adapting to additional changes in the conditions. For example, a non-video stream task operating on the device may place a higher demand on shared general-purpose processing resources, which is detected in box 206. In box 209, the decode architecture may adapt to minimize its reliance on such shared resources by selecting other decoder pipeline elements 106 that are either less shared-resource consumptive or operate in dedicated hardware. In box 212, the streams are transitioned before returning to box 206. These and other adaptation examples can apply equally to transcoder and encoder elements and tiers as well.

In another embodiment, the adaptable video architecture may provide for a scalable video pipeline. Video processing predicts the current frame content utilizing previous content from previous video frames. For example, H.264 uses this temporal coding for video processing. Other spatial and quality coding may also be used for video processing. Scalable video coding (SVC) is an extension of H.264 that uses video information at different resolutions to predict current frame content. SVC defines a plurality of subset bitstreams, with each subset being independently decodable in a similar fashion as a single H.264 bitstream. Merely by dropping packets from the larger overall bitstream, a subset bitstream can be exposed. Each subset bitstream can represent one or more of scalable resolution, frame rate, and quality video signal. More particularly, the subset bitstreams represent video layers within SVC with the base layer being fully compatible with H.264 (which is a single layer standard definition). When the overall bitstream is transmitted (e.g., by over air broadcast), a receiving device can use the appropriate subset bitstream to perform the video processing. The additional subset bitstream layers can be discarded or used to for temporal, spatial and/or signal quality improvements.

The adaptable video (transcode-encode-decode) architecture has at least two modes. First, the adaptable architecture is instantiated once for H.264 decode or other single layer standard. Second, the adaptable architecture is instantiated multiple times, each instance designed to accelerate the decoding of one SVC layer to improve the generated video image. For example, a lower resolution H.264 decode pipeline (M) may dump out internal aspects, which may then be read into next higher resolution layer (M+1). Information of values may be tapped out such as, e.g., motion vectors, transform coefficients, and/or image data prior to the application of the deblocking filter for use in the higher resolution pipeline. This may also be applied to multiple layers of progressively higher quality (and/or bitrate) at the same resolution or combined with different resolution layers. For example, a lower quality layer (e.g., signal-to-noise ratio or fidelity) may dump out internal aspects, which may then be read into next higher quality layer. The interlayer interpolations (e.g., up sampling and/or filtering) may be performed externally by software modules executed by shared general-purpose processing resources of the video device, or by dedicated hardware.

This may be extended to cover modalities to service multiple simultaneous streams, as well as (i) software only modes; (ii) sequential serial instantiation and use; (iii) cyclical serial flows; and (iv) a mix of (ii) and (iii). For example, in some implementations, a decoder may include a plurality of decode pipelines 103 (FIG. 1) with each decode pipeline 103 is associated with a different resolution. The decode pipelines 103 may be implemented in hardware and/or software modules executed by general-purpose processing resources. Information may be tapped out of a lower resolution decode pipeline (M), processed using an interlayer interpolation, and supplied to the next higher resolution decode pipeline (M+1) for use. In other implementations, a single decode pipeline may be used to perform the video processing at multiple resolutions. In this case, the decode pipeline 103 performs the video processing at a first resolution (M) with information being extracted as appropriate. The decode pipeline 103 may then performs the video processing at the next resolution (M+1) or at another higher resolution (e.g., M+2). Processing flow may be adjusted by sequencing the flow through the different decoding pipelines 103 as appropriate. In addition, encoder and transcoder pipelines may share some of the same functionality.

Figure 3:
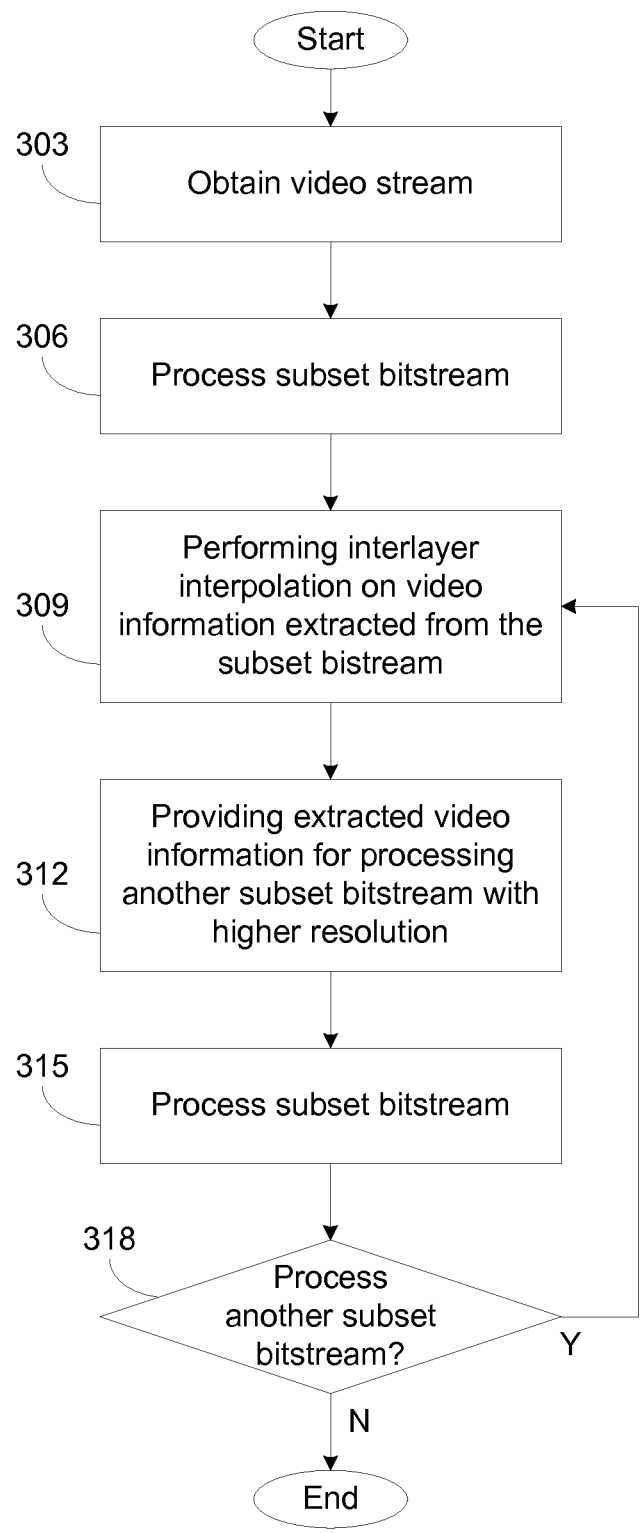
FIG. 3 is a flow chart illustrating an example of scalable video pipeline processing in accordance with various embodiments of the present disclosure.

Referring to FIG. 3, shown is a flow chart illustrating an example of scalable video pipeline processing. Beginning with box 303 a video stream is obtained by a video device. The video stream includes a plurality of subset bitstreams that may be processed by, e.g., a video decode pipeline of the video device. A first subset bitstream having a first resolution is processed in the video pipeline of the video device in box 306. As discussed above, video information associated with the first subset bitstream is extracted (or tapped) from the video pipeline during processing of the first subset bitstream. In box 309, interlayer interpolation is performed on at least a portion of the extracted video information.

In box 312, at least a portion of the extracted video data is provided to a video pipeline of the video device for processing in box 315 of a second subset bitstream having a second resolution higher than the first resolution. In box 318, if another higher resolution subset bitstream is to be processed, then the flow returns to box 309 where interlayer interpolation is performed on at least a portion of the video information extracted during processing of the second subset bitstream. The flow continues until the processing of a higher subset bitstream ends at box 318.

Figure 4:
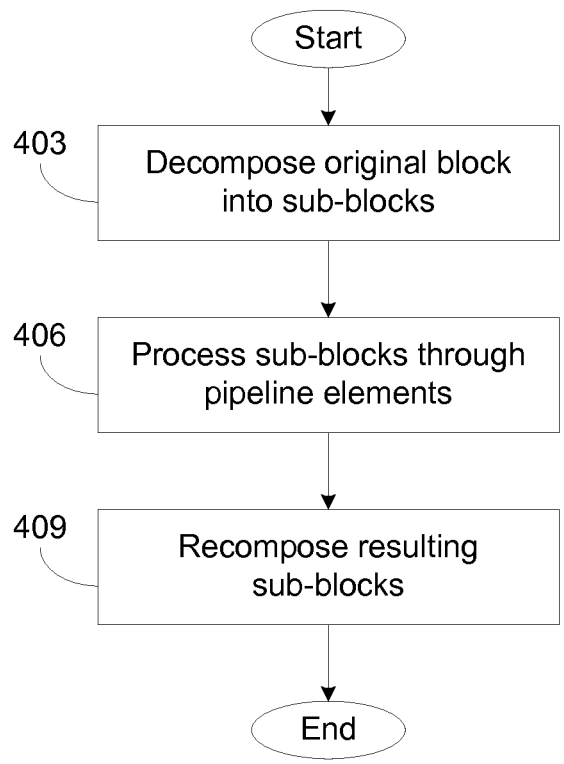
FIG. 4 is a flow chart illustrating an example of pixel block size decomposition of video pixel blocks in accordance with various embodiments of the present disclosure.

In some embodiments, the adaptable video architecture may provide for pixel block size decomposition of the standard pixel block sizes defined by a standard. With reference to FIG. 4, shown is a flowchart illustrating the decomposition/recomposition of the standard pixel blocks. Beginning with box 403, an original pixel block may be decomposed into multiple sub-blocks which are fed through (decoding-encoding-transcoding) pipeline elements in box 406 before recomposing the results in box 409 to form a processed pixel block. Each sub-block may be processed by a different pipeline. Such multi-element pipelines may also be a single pipeline with multiple coding elements that happen to cycle on each sub-block before recomposition. In some cases, single element decomposition and re-composition may be achieved. Improved performance and efficiencies may be realized through the parallel processing of the sub-blocks.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method for adapting video processing of a video device, comprising:
   processing a video stream along a first pipeline pathway defined by a plurality of interconnected pipeline elements, the first pipeline pathway corresponding to a first video coding standard;
   detecting a change in a system condition of the video device, the change in condition being nondisruptive of processing the video stream along the first pipeline pathway;
   responsive to the change in condition, transitioning the first pipeline pathway to a second pipeline pathway by reconfiguring at least one of the pipeline element interconnections and synchronizing to a reference frame; and
   processing another video stream along another pipeline pathway concurrent to processing the video stream along the second pipeline pathway, the another pipeline pathway corresponding to a second video coding standard that is different than the first video coding standard, wherein processing the another video stream comprises predicting at least a portion of a current frame based at least in part on a previous frame.

2. The method of claim 1, further comprising determining the second pipeline pathway based at least in part upon the detected change in condition.

3. The method of claim 1, wherein the at least one pipeline element interconnection is reconfigured to divert processing of the video stream to include processing by a software module executed by a processing resource of the video device in the second pipeline pathway.

4. The method of claim 3, wherein the second pipeline pathway includes processing of the video stream by a plurality of software modules.

5. The method of claim 1, wherein the second pipeline pathway does not include at least one pipeline element included in the first pipeline pathway.

6. The method of claim 1, wherein the first pipeline pathway includes processing of the video stream by at least one software module executed by a processing resource of the video device.

7. The method of claim 6, wherein the second pipeline pathway includes a dedicated hardware for video processing.

8. The method of claim 1, further comprising:
   detecting a second change in a system condition of the video device; and
   responsive to the second change in condition, transitioning the pipeline pathway to a third pipeline pathway.

9. The method of claim 1, wherein the detected change in the system condition is a change in a battery condition of the video device.

10. The method of claim 1, wherein the detected change in the system condition is a change in a load balancing of shared processing resources.

11. The method of claim 1, wherein the detected change in the system condition is a change in a video stream condition.

12. The method of claim 1, further comprising:
    obtaining an original pixel block of the video stream;
    decomposing the original pixel block into sub-blocks;
    processing each of the sub-blocks through at least one of the plurality of interconnected pipeline elements, a first sub-block of the sub-blocks being processed through a different one of the plurality of interconnected pipeline elements than a second sub-block of the sub-blocks; and
    recomposing the processed sub-blocks to form a processed pixel block.

13. A video device comprising:
    at least one processor circuit that is configured to:
    process a video stream along a first pipeline pathway defined by a plurality of interconnected pipeline elements, wherein the first pipeline pathway corresponds to a first video coding standard;
    detect a change in a system condition of the video device while the video stream continues to be processed along the first pipeline pathway;
    responsive to the change in the system condition, select a second pipeline pathway by reconfiguring at least one interconnection of the plurality of interconnected pipeline elements;
    transition the first pipeline pathway to the second pipeline pathway including synchronizing to a reference frame; and
    process another video stream along another pipeline pathway concurrent to processing the video stream along the second pipeline pathway, the another pipeline pathway corresponding to a second video coding standard that is different than the first video coding standard.

14. The video device of claim 13, wherein the at least one processor circuit is further configured to select the second pipeline pathway from a plurality of pipeline pathways based at least on a set of conditions.

15. The video device of claim 13, wherein the at least one processor circuit is further configured to select the second pipeline pathway by using at least a pattern recognition system.

16. The video device of claim 13, wherein the at least one processor circuit is further configured to:
    detect a selection of a second video stream; and responsive to the detected second video stream, transition the first pipeline pathway or the second pipeline pathway to a third pipeline pathway.

17. The video device of claim 16, wherein the video stream and the second video stream are different types of video streams.

18. The video device of claim 13, wherein the at least one processor circuit is further configured to:
- obtain an original pixel block of the video stream;
- decompose the original pixel block into sub-blocks;
- process each of the sub-blocks through at least one of the plurality of interconnected pipeline elements, a first sub-block of the sub-blocks being processed through a different one of the plurality of interconnected pipeline elements than a second sub-block of the sub-blocks; and
- recompose the processed sub-blocks to form a processed pixel block.

19. A computer program product comprising instructions stored in a tangible non-transitory computer-readable storage medium, the instructions comprising:
- instructions for processing a first video stream along a first pipeline pathway defined by a plurality of interconnected pipeline elements, the first pipeline pathway corresponding to a first video coding standard;
- instructions for detecting a selection of a second video stream for processing;
- instructions for transitioning the first pipeline pathway to an alternate pipeline pathway for processing the first video stream by reconfiguring at least one interconnection of the plurality of interconnected pipeline elements and synchronizing to a reference frame in response to the selection of the second video stream for processing; and
- instructions for processing the second video stream along a second pipeline pathway concurrent to processing the first video stream along the alternate pipeline pathway, the second pipeline pathway corresponding to a second video coding standard that is different than the first video coding standard, wherein processing the second video stream comprises predicting at least a portion of a current frame based at least in part on a previous frame.

20. The computer program product of claim 19, further comprising instructions for selecting the second pipeline pathway to replace a shared resource with a dedicated hardware for video processing.

21. The computer program product of claim 19, further comprising instructions for selecting the second pipeline pathway that utilizes less power than the first pipeline pathway.

22. The computer program product of claim 19, the instructions further comprising:
- instructions for obtaining an original pixel block of the video stream;
- instructions for decomposing the original pixel block into sub-blocks;
- instructions for processing each of the sub-blocks through at least one of the plurality of interconnected pipeline elements, a first sub-block of the sub-blocks being processed through a different one of the plurality of interconnected pipeline elements than a second sub-block of the sub-blocks; and
- instructions for recomposing the processed sub-blocks to form a processed pixel block.

\* \* \* \* \*